United States Patent
Han

(10) Patent No.: US 6,493,058 B1
(45) Date of Patent: Dec. 10, 2002

(54) LIQUID CRYSTAL DISPLAY

(75) Inventor: Kwan-young Han, Anyang (KR)

(73) Assignee: Samsung SDI Co., LTD, Kyungki-do (KR)

( * ) Notice: Subject to any disclaimer, the term of this patent is extended or adjusted under 35 U.S.C. 154(b) by 0 days.

(21) Appl. No.: 09/633,134

(22) Filed: Aug. 4, 2000

(30) Foreign Application Priority Data

Sep. 22, 1999 (KR) ............................................. 99-41051

(51) Int. Cl.⁷ ............................................. G02F 1/1305
(52) U.S. Cl. ............................................................ 349/155
(58) Field of Search ............................................. 349/155

(56) References Cited

U.S. PATENT DOCUMENTS 5,309,263 A * 5/1994 Sato ........................... 349/123
5,545,485 A * 8/1996 Hashitani et al. ......... 428/423.1
6,108,068 A * 8/2000 Yano et al. .................. 349/155

FOREIGN PATENT DOCUMENTS

| JP | 401281419 | * 11/1989 | ................. 349/155 |
| JP | 401281421 | * 11/1989 | ................. 349/155 |
| JP | 406110064 | * 4/1994 | ................. 349/155 |

* cited by examiner

Primary Examiner—James Dudek
(74) Attorney, Agent, or Firm—Leydig, Voit & Mayer, Ltd.

(57) ABSTRACT

A liquid crystal display including upper and lower substrates facing each other, electrodes and alignment layers sequentially disposed on and between the upper and lower substrates, a liquid crystal layer interposed between the alignment layers, and a spacer for controlling the distance between the upper and lower substrates, wherein an ion-absorbing material layer coats the spacer. Since an adverse phenomenon caused by generation of ions or contaminants in a liquid crystal cell is prevented, the reliability of the liquid crystal display is improved. Blurriness is prevented from occurring on a displayed picture due to a change in the alignment characteristic of the liquid crystal material. Also, crosstalk and deterioration of contrast are prevented by suppressing a decrease in the specific resistance of the liquid crystal material.

2 Claims, 1 Drawing Sheet

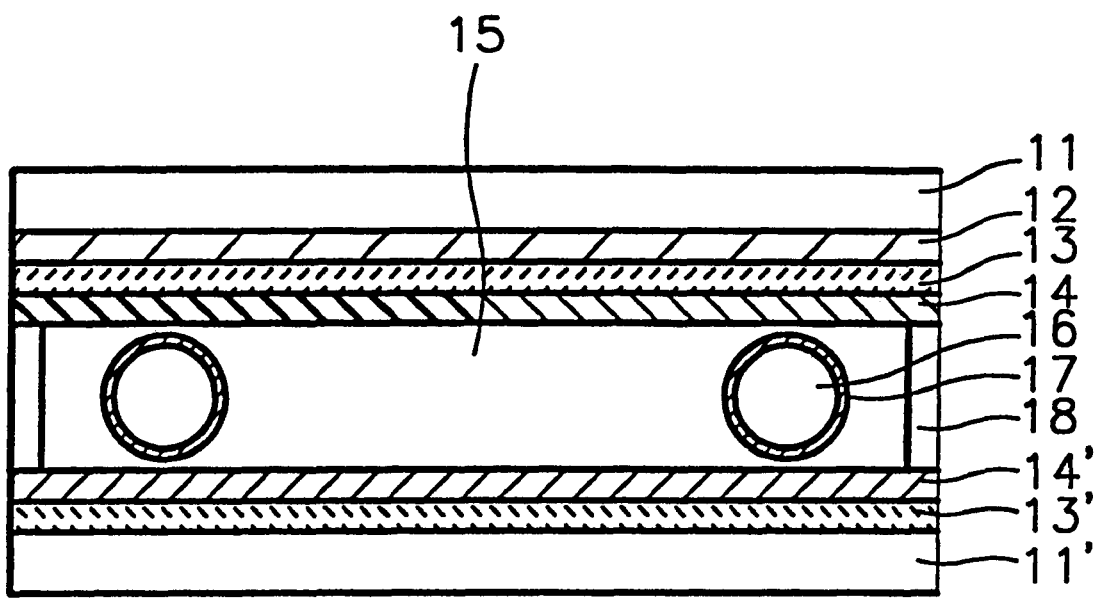

LIQUID CRYSTAL DISPLAY

BACKGROUND OF THE INVENTION

1. Field of the Invention

The present invention relates to a liquid crystal display, and more particularly, to a reliable liquid crystal display which exhibits excellent contrast and excellent picture quality, irrespective of a change with the passage of time, and which can prevent crosstalk.

2. Description of the Related Art

Liquid crystal displays are light-reflecting devices which receive light from an external source to display an image, and play an important role in the field of display devices because they consume little electric power compared to other devices, are able to be manufactured in various sizes, and are capable of displaying various patterns.

A general liquid crystal display has upper and lower substrates facing each other, upper and lower electrodes and an alignment layer sequentially disposed on each substrate, and a liquid crystal layer between the alignment layers.

In the aforementioned liquid crystal display, the alignment of liquid crystals varies according to application of an external voltage. External light applied to the liquid crystal display is shielded or transmitted according to a change in the alignment of liquid crystals. That is to say, if a voltage is applied to the liquid crystal display, an electric field is formed at the liquid crystal layer. As a result, liquid crystals are aligned in a predetermined direction, and external light applied to the liquid crystal display is shielded or transmitted, thereby creating an image on the screen of the liquid crystal display.

However, as time passes, contaminants such as dust and ions are generated at the alignment layers or sealing member of the liquid crystal display, which may deteriorate contrast characteristics of the liquid crystal display and cause crosstalk. Also, the alignment characteristic of liquid crystals varies, causing blurry areas on a picture.

In more detail, in the case of using polar liquid crystals having a high dielectric constant, a polar liquid crystal material partially dissolves the sealing member so that ions are generated at the interface between the liquid crystal layer and the sealing member, thereby lowering the purity of the liquid crystal material.

Also, the alignment layer is mainly formed by a rubbing method in which a thin film made of an organic polymer such as polyimide is formed on a substrate and hardened, and then the resultant product is rubbed with a specific cloth to control the orientation of liquid crystal molecules. However, fine particles or cellulose may be separated from the specific cloth to produce contaminants. Also, the thin-film transistor may be damaged by static electricity generated during rubbing, thereby deteriorating the performance of the liquid crystal display.

SUMMARY OF THE INVENTION

It is an object of the present invention to provide a reliable liquid crystal display which exhibits excellent contrast and excellent picture quality, irrespective of a change with the passage of time, and which can prevent crosstalk.

Accordingly, to achieve the above object, there is provided a liquid crystal display liquid crystal display including upper and lower substrates facing each other, electrodes and alignment layers each sequentially formed on the upper and lower substrates, a liquid crystal layer interposed between the alignment layers respectively formed on the upper and lower substrates, and a spacer for controlling the distance between the upper and lower substrates, wherein an ion-absorbing material coated layer is formed on the surface of the spacer.

BRIEF DESCRIPTION OF THE DRAWING

The above object and advantages of the present invention will become more apparent by describing in detail a preferred embodiment thereof with reference to the attached drawing which, shows the structure of a liquid crystal display according to a preferred embodiment of the present invention.

DESCRIPTION OF THE PREFERRED EMBODIMENT

The characteristics of a liquid crystal display such as response speed, contrast or angle of view are closely related to the thickness of a liquid crystal layer. Thus, it is very important to accurately set the thickness of the liquid crystal layer to conform to the optical properties of the liquid crystal material used. If the thickness of a liquid crystal layer is not controlled accurately, blurry areas may be caused on a picture, resulting in considerable deterioration of picture quality. A spacer serves to appropriately control the thickness of a liquid crystal layer, that is, a cell gap. The novel feature of the present invention lies in that an ion-absorbing material layer is formed on the surface of a spacer to absorb and eliminate ions derived from the alignment layer or sealing member and contaminants such as dust.

Also, in the liquid crystal display of the present invention, the alignment layer may contain an ion-absorbing material. Here, as the ion-absorbing material, any material that absorbs and eliminates ions generated in a liquid crystal cell can be used. Specific examples of the ion-absorbing material include ion exchange resins, made commercially available by Aldrich under the names of Amberite resin and Sephadex resin, a chloromethylated styrene/divinylbenzene copolymer, made commercially available by Aldrich under the name of Merrifield's peptide resin, and silica gel.

An example of a liquid crystal display according to the present invention will now be described in detail with reference to the FIGURE.

Referring to the FIGURE, a liquid crystal display includes upper and lower substrates 11 and 11' facing each other. A color filter layer 12 is formed on the upper substrate 11. ITO electrodes 13 and 13' are formed on the color filter layer 12 on the upper substrate 11 and on the lower substrate 11', respectively. Alignment layers 14 and 14' for alignment of liquid crystals are formed on the ITO electrodes 13 and 13', respectively. A liquid crystal layer 15 is formed between the alignment layers 14 and 14' formed on the ITO electrodes 13 and 13', and a spacer 16 is provided for adjusting the thickness of the liquid crystal layer 15 to be in a predetermined range by maintaining a predetermined gap between the upper and lower substrates 11 and 11'. Here, the upper and lower substrates 11 and 11' are connected to each other by a sealing member 18.

In the liquid crystal display having the aforementioned configuration, an ion-absorbing material layer 17 is coats the surface of the spacer 16. The thickness of the ion-absorbing material layer 17 is not specifically restricted, but is preferably 500 to 1500 Å. Alternatively, the alignment layers 14 and 14' may contain ion-absorbing material. Ions produced from the sealing member 18 for connecting and hermetically sealing the alignment layers 14 and 14' and the upper and lower substrates 11 and 11', or other contaminants, can be effectively absorbed and eliminated by forming an ion-absorbing material layer on the surface of a spacer and by using alignment layers containing an ion-absorbing material.

The ion-absorbing material layer 17 coating the spacer 16 is formed by applying a composition prepared by dissolving 0.5 to 5% by weight of an ion-absorbing material in a solvent, and drying the composition. Here, any solvent that is capable of dissolving and/or dispersing an ion-absorbing material, can be used as the solvent.

The ion-absorbing material containing alignment layer is formed by applying a composition prepared by mixing polyimide, which is a polymer for forming an alignment layer, a solvent and an ion-absorbing material, drying and aligning the resultant film. Here, the aligning method of the alignment layer is not specifically restricted, but a rubbing treatment is used in the present invention. Also, the content of the ion-absorbing material contained in the composition for forming the alignment layer is preferably 0.5 to 5% by weight, based on the total weight of the composition.

In the liquid crystal display according to the present invention, any kind of conventional spacers can be used. For example, both an inorganic spacer and a plastic spacer can be used.

As described above, if an ion-absorbing material layer coats the surface of a spacer in a liquid crystal cell and/or an ion-absorbing material is incorporated into an alignment layer, a change in the alignment characteristic of liquid crystals over time can be minimized. Therefore, since picture quality, contrast and leakage-free characteristics are not affected by the passage of time, the reliability of a liquid crystal display is enhanced.

According to the present invention, since an adverse phenomenon caused by generation of ions or contaminants in a liquid crystal cell can be prevented, the reliability of a liquid crystal display can be improved. In other words, blurriness can be prevented from occurring on a displayed picture due to a change in the alignment characteristic of liquid crystals. Also, crosstalk and deterioration of contrast can be prevented by suppressing a decrease in the specific resistance of liquid crystals.

What is claimed is:

1. A liquid crystal display comprising:

upper and lower substrates facing each other;

electrodes and alignment layers sequentially disposed between and on the upper and lower substrates, respectively;

a liquid crystal layer interposed between the alignment layers respectively located on the upper and lower substrates; and a spacer for controlling separation between the upper and lower substrates and having a coating of an ion-absorbing material selected from the group consisting of chloromethylated styrene/divinylbenzene copolymer and silica gel.

2. A liquid crystal display comprising:

upper and lower substrates facing each other;

electrodes and alignment layers sequentially disposed between and on the upper and lower substrates, respectively, wherein the alignment layers contain an ion-absorbing material;

a liquid crystal layer interposed between the alignment layers respectively located on the upper and lower substrates; and a spacer for controlling separation between the upper and lower substrates and having a coating of an ion-absorbing material selected from the group consisting of a chloromethylated styrene/divinylbenzene copolymer and silica gel.

* * * * *